United States Patent [19]

Bender et al.

[11] Patent Number: 5,261,631
[45] Date of Patent: Nov. 16, 1993

[54] MOMENTUM WHEEL PLATFORM STEERING SYSTEM AND METHOD

[75] Inventors: Douglas J. Bender, Redondo Beach; James D. Brehove, Corona, both of Calif.

[73] Assignee: Hughes Aircraft Company, Los Angeles, Calif.

[21] Appl. No.: 720,103

[22] Filed: Jun. 24, 1991

[51] Int. Cl.[5] ............................................. B64G 1/28
[52] U.S. Cl. .................................................... 244/165
[58] Field of Search ............................... 244/164, 165

[56] References Cited

U.S. PATENT DOCUMENTS

| | | | |
|---|---|---|---|
| 3,452,948 | 7/1969 | Kukel et al. | 244/165 |
| 3,493,194 | 2/1970 | Kurzhals | 244/165 |
| 3,741,500 | 6/1973 | Liden . | |
| 4,052,654 | 10/1977 | Kramer et al. | 244/165 |
| 4,919,382 | 4/1990 | Forman | 244/165 |
| 5,112,012 | 5/1992 | Yuan et al. | 244/165 |

FOREIGN PATENT DOCUMENTS 0424937 10/1990 European Pat. Off. .
2190667 2/1974 France .

OTHER PUBLICATIONS

John Dzielski "Approach to Control Moment Gyroscope Steering Using Feedback Linearization" 169a Journal of Guidance Control and Dynamics 14 (1991) Jan./Feb., No. 1.
European Search Report EP 92 10 7719.

Primary Examiner—Galen Barefoot
Attorney, Agent, or Firm—Gordon R. Lindeen, III; Wanda K. Denson-Low

[57] ABSTRACT

Method and apparatus for controlling the two-axis rate and position as well as the linear elevation of a momentum wheel platform supported by three jackscrews driven by stepper motors. By tilting the momentum wheel, a control torque is produced in the plane orthogonal to the nominal wheel spin axis. When all three actuators are operational, the control transformations are made unique by constraining the sum of the actuator extensions to be zero. When one actuator has failed, the above constraint is eliminated and the failed actuator is constrained to its measured value. Momentum wheel platform rotational rate commands generated by the roll/yaw control system are first integrated to give desired gimbal angles, and then transformed into jackscrew extensions. Jackscrew step commands are computed as the difference between these desired extensions and the current positions of the jackscrews. The position of each jackscrew is maintained by accumulating the step commands. The desired extensions are also back-transformed to compute gimbal angles that are fed back to the roll-yaw state control system. In ground commanded stepping, the momentum wheel platform steering method operates exactly as described above, except that relative jackscrew step commands from a ground station are utilized instead of the step commands computed in the rate following configuration.

20 Claims, 9 Drawing Sheets

MOMENTUM WHEEL PLATFORM STEERING SYSTEM AND METHOD

BACKGROUND

The present invention relates generally to attitude stabilization of spacecraft, and more particularly, to a momentum wheel platform steering system and method that provides attitude control of body-stabilized satellites.

It is well known to use momentum wheels to compensate for periodic disturbing torques which act on stabilized spacecraft such as geostationary communication satellites, for example. The momentum wheel is mounted on the spacecraft for rotation about an axis that is selectively oriented relative to the axes of the spacecraft, commonly orthogonal to the plane of the spacecraft's orbit.

The speed of the momentum wheel is simply increased or decreased to provide active control about the axis orthogonal to the orbit plane, the angular momentum of the wheel being sufficient to compensate for the effects of disturbing torques on the spacecraft. To achieve active control about axes in the orbit plane or to compensate for effects of disturbing torques about such axes, the momentum wheel axis orientation must be tilted.

Heretofore, it has been contemplated that momentum wheels of the type described above may be mounted on a spacecraft by means of a double gimbal system similar to those long used to mount compasses and the like, which employ redundancy in the drive mechanisms of each axis. The gimbal mounting arrangement is less than completely satisfactory for several reasons. The prior gimbals were relatively complex in design, were heavier than desired (an important factor in spacecraft) and were subject to reliability problems. In the event that any portion of one of the gimbals failed, the entire momentum wheel assembly was inoperable.

Another type of tilting momentum wheel is described in a publication entitled "CMG's and Momentum Wheels," Revision 3, Publication No. 61-7223-00-03, published by Sperry Flight Systems. The momentum tilt wheel described in this publication is capable of providing three-axis attitude control and includes two linear gimbal actuators positioned around the periphery of the momentum wheel and a single center spherical ball bearing pivot which suspends the wheel. Spherical pivots are provided on each end of the actuators and thus act as hinge points at the vehicle interface and the interface with the housing which surrounds the wheel. This type of momentum wheel also suffers from a number of disadvantages, including the fact that the wheel cannot be properly positioned in the event that either of the linear actuators malfunctions.

The present invention is a novel control method and apparatus for steering momentum wheel platforms such as those discussed in U.S. patent application Ser. No. 07/427,675, filed Oct. 26, 1989, of Mark S. Yuan and Alois Wittmann, and assigned to the assignee of the present invention.

SUMMARY OF THE INVENTION

The momentum wheel platform steering system is a method and apparatus for controlling the two-axis rate and position, and the linear elevation, of a momentum wheel platform supported by three linear actuators (jackscrews) driven by separate stepper motors. By using the momentum wheel platform steering system to tilt the momentum wheel, a control torque is produced in the plane orthogonal to the nominal wheel spin axis. The momentum wheel platform steering method and apparatus of the present invention is adapted for use as the primary attitude control system for the AUSSAT B, GALAXY, ASTRA, and MSAT satellites.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
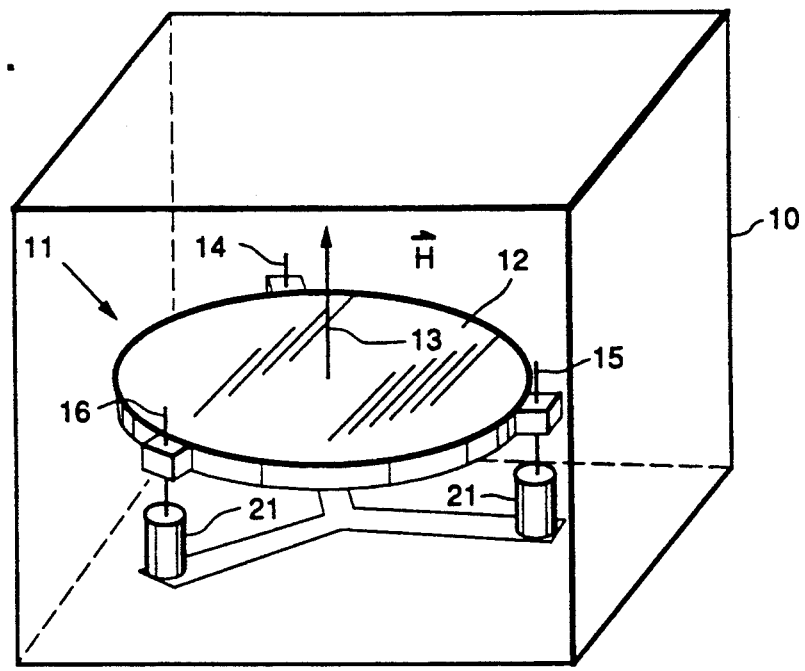
FIG. 1 is a diagrammatic representation of a spacecraft having a momentum wheel platform assembly.

Referring now to the drawings, FIG. 1 is a diagrammatic representation of a spacecraft 10 having a momentum wheel platform assembly 11 disposed therein to provide attitude stabilization thereof. This type of spacecraft 10 is referred to as a momentum-biased body stabilized vehicle or three axis stabilized vehicle as opposed to a spin stabilized vehicle. Typically, such a spacecraft 10 may be provided with two such momentum wheel platform assemblies 11 for redundancy, one being referred to as the north momentum wheel assembly, and the other being referred to as the south momentum wheel assembly. However, the diagrammatic representation of FIG. 1 shows only one momentum wheel platform assembly 11 for simplicity. The momentum wheel platform assembly 11 is provided with a high speed momentum wheel 12 that spins about a spin axis 13 that is nominally aligned with the y-axis of the spacecraft 10. The momentum wheel 12 is supported by three linear actuators such as jackscrews 14, 15, 16 disposed every 120° around the periphery thereof and pivotally mounted thereto. The jackscrews 14, 15, 16 are driven by stepper motors 21 to tilt the momentum wheel 12.

Figure 2:
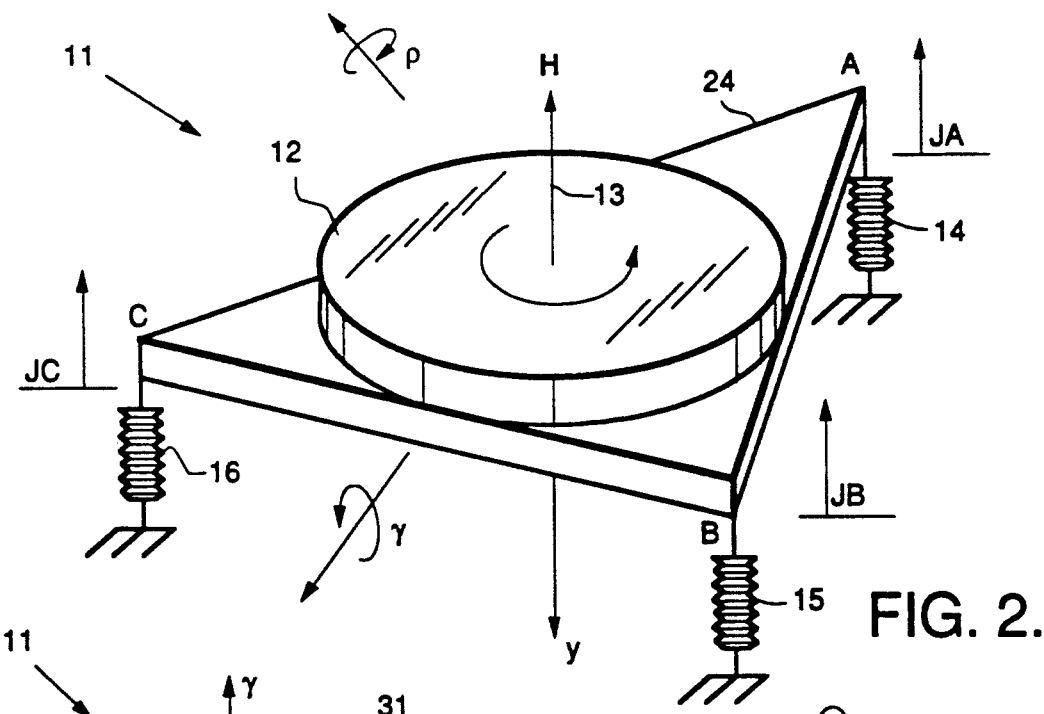
FIG. 2 is a schematic illustration of a triangular platform having a momentum wheel mounted thereon and having linear actuators connected to each corner thereof.

Referring now to FIG. 2, typically the momentum wheel platform assembly 11 may be embodied as a triangular equilateral platform 24 having one of the jackscrews 14, 15, 16 pivotally fastened to each corner thereof, and the momentum wheel 12 supported thereby. The three jackscrews 14, 15, 16 operate as linear actuators, and each jackscrew 14, 15, 16 may be positioned independently, or they all may be operated simultaneously to cause the triangular platform 24 to rotate about two axes at desired rates. The present invention is a method and apparatus that may be employed to control the two-axis rate and position as well as the linear elevation of the triangular platform 24 carrying the momentum wheel 12. By using the steering system of the present invention to tilt the momentum wheel 12, a control torque may be produced in the plane orthogonal to the nominal wheel spin axis 13.

Figure 3:
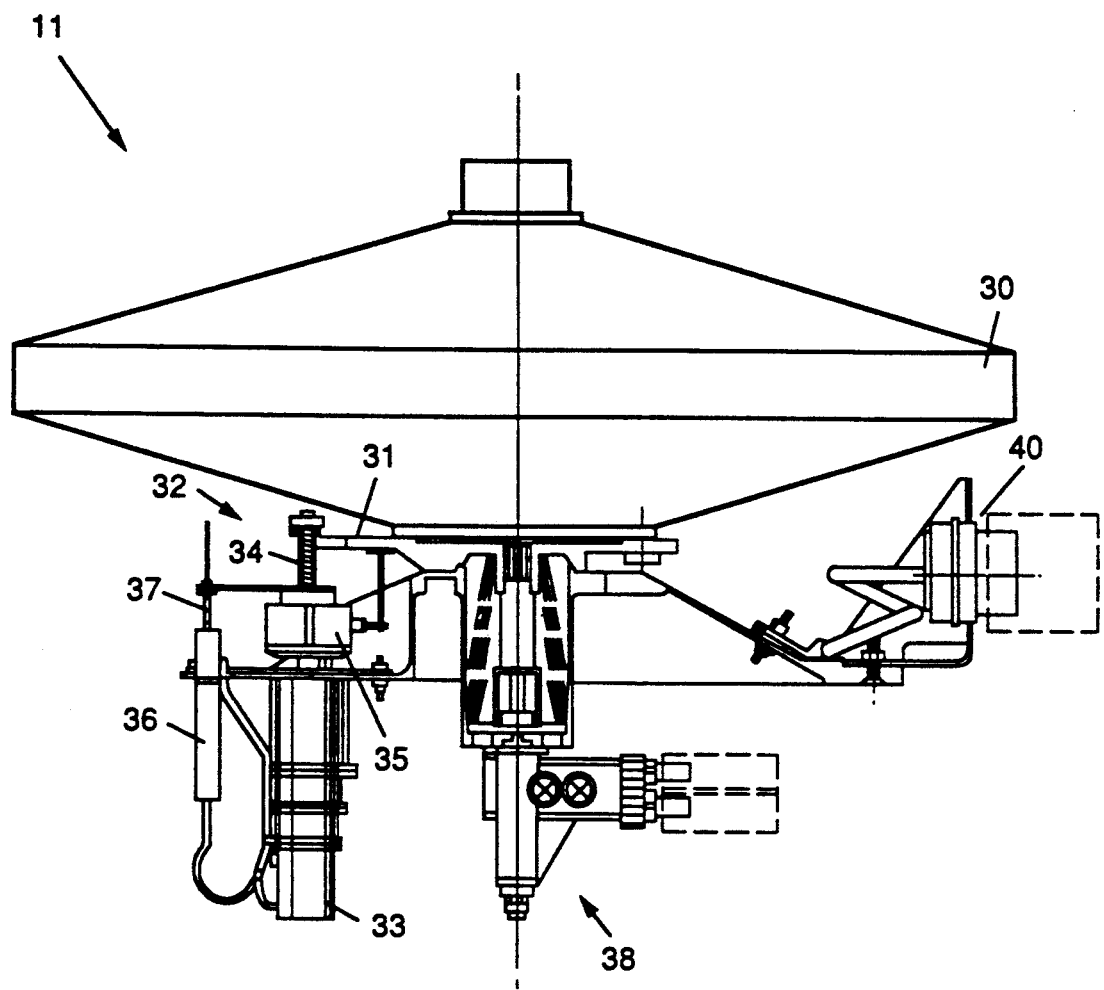
FIG. 3 is a side view of an actual embodiment of a momentum wheel platform assembly with which the momentum wheel platform steering method and apparatus of the present invention may be employed.

Referring now to FIG. 3, there is shown a side view of an actual embodiment of a momentum wheel platform assembly 11 shown and described in U.S. patent application Ser. No. 07/427,675, filed Oct. 26, 1989, by Mark S. Yuan and Alois Wittmann, entitled "Tilting Momentum Wheel for Spacecraft", and assigned to the assignee of the present invention. A momentum wheel 30 is mounted to a triangular platform 31 having a tilting mechanism 32 secured at each corner thereof. Only one of the three tilting mechanisms 32 is shown in FIG. 3. Each of the tilting mechanisms 32 comprises a stepper motor 33 which rotates a threaded screw shaft 34. A threaded spherical nut member 35 is threadably mounted on the screw shaft 34, and is displaced along the longitudinal axis of the shaft 34 upon rotation thereof. The spherical nut member 35 includes a spherical socket member that acts as a pivot. The momentum wheel 30 and the triangular platform 31 tilt as a single unit. Three linear potentiometers 36 are each individually secured to one of the three corners of the triangular platform 31 and has a shaft 37 connected to the nut member 35. Each potentiometer 36 produces a voltage whose amplitude is related to the tilting displacement produced by its corresponding tilting mechanism 32. The momentum wheel platform assembly 11 is provided with a launch lock 38 for locking the momentum wheel 30 prior to and during launch. An electrical connector 40 is provided to connect the electrical terminals of the stepper motors 33 and the potentiometers 36 to a spacecraft signal processor.

Figure 4:
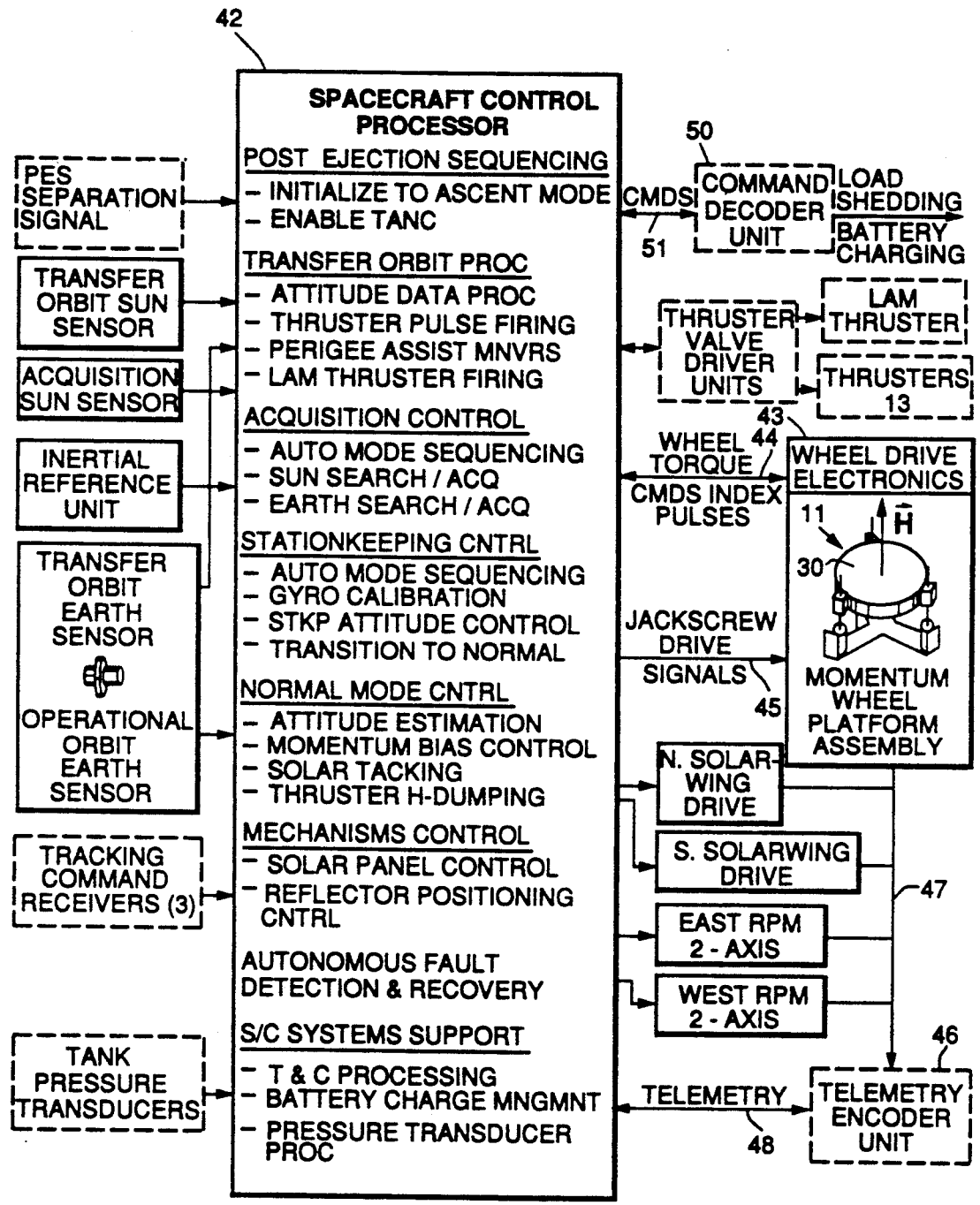
FIG. 4 is a simplified schematic diagram in block form of a spacecraft control processor interconnected with the momentum wheel platform assembly of FIG. 3.

FIG. 4 is a simplified schematic diagram in block form of a spacecraft control processor 42 interconnected with the momentum wheel platform assembly 11 of FIG. 3. It will be understood that the spacecraft control processor 42 also controls many other systems and processes completely unrelated to momentum wheel control that will not be described herein. The momentum wheel platform assembly 11 is coupled to wheel drive electronics 43 that controls the speeding up and slowing down of the momentum wheel 30. The wheel drive electronics 43 also generates index pulses that indicate the speed of revolution of the wheel 30 and the direction of revolution. The index pulses are transmitted to the spacecraft control processor 42 via a first bus 44, and wheel torque commands are transmitted to the wheel drive electronics 43 via the first bus 44. Jackscrew drive signals are transmitted to the momentum wheel platform assembly 11 by way of a second bus 45. The extension of each jackscrew 14, 15, 16 is indicated by the amplitude of the voltage produced by each of the linear potentiometers 36. In the present embodiment shown in FIG. 4, the measurements from the linear potentiometers 36 are transmitted from the momentum wheel platform assembly 11 to a telemetry encoder unit 46 via a third bus 47. The telemetry encoder unit 46 is coupled to the spacecraft control processor 42 by means of a fourth bus 48. It will be understood that the measurements from the linear potentiometers 36 may be transmitted to the spacecraft control processor 42 or to a ground control station, as desired. A command decoder unit 50 is coupled to the spacecraft control processor 42 by a fifth bus 51. It will be understood that signals from the momentum wheel platform assembly 11 may be telemetered to a ground control station, and that ground commands may be applied to the momentum wheel platform assembly 11.

Figure 5A:
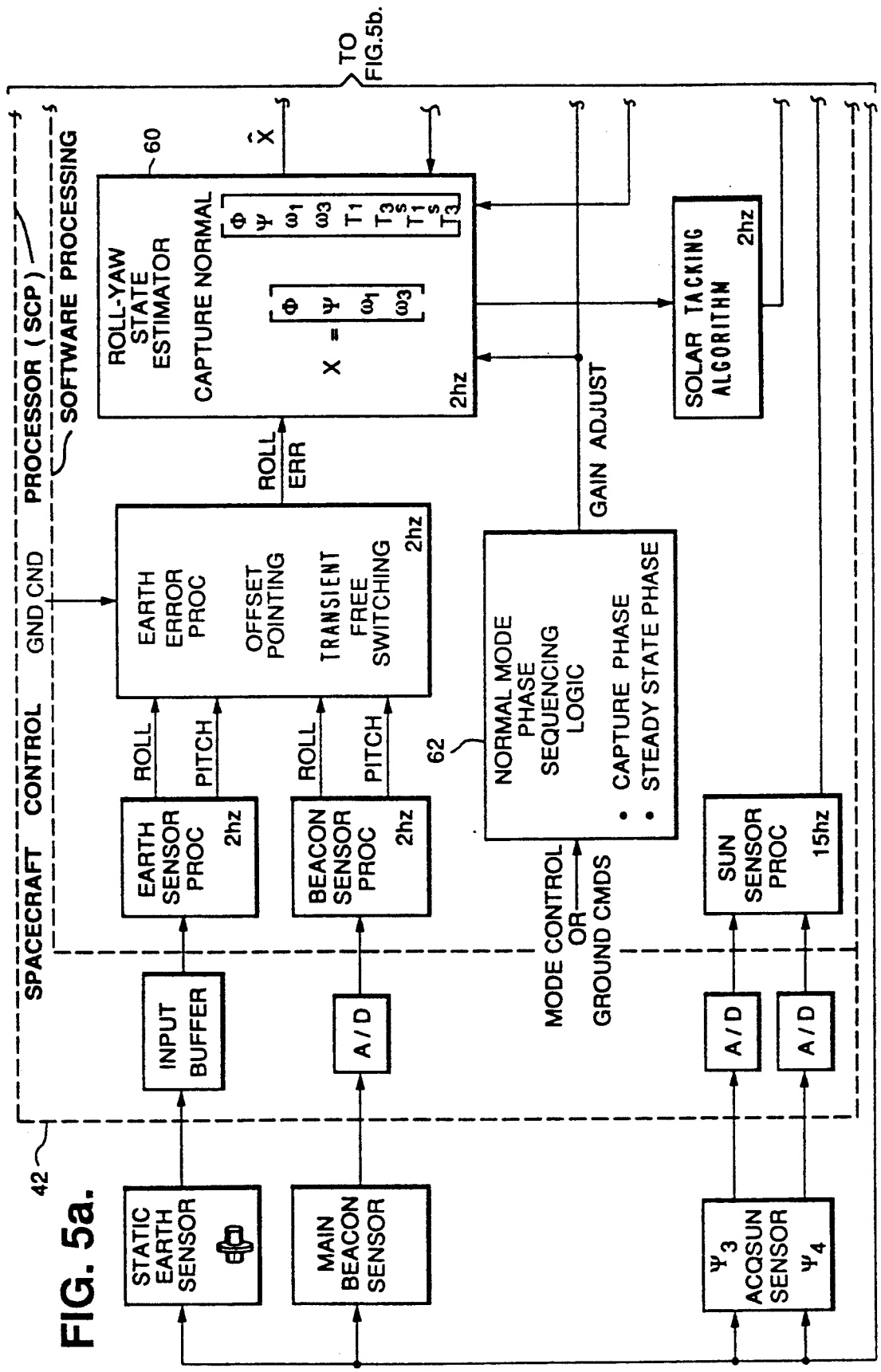
FIG. 5 is a simplified schematic diagram in block form of the spacecraft control processor of FIG. 4.
Figure 5B:
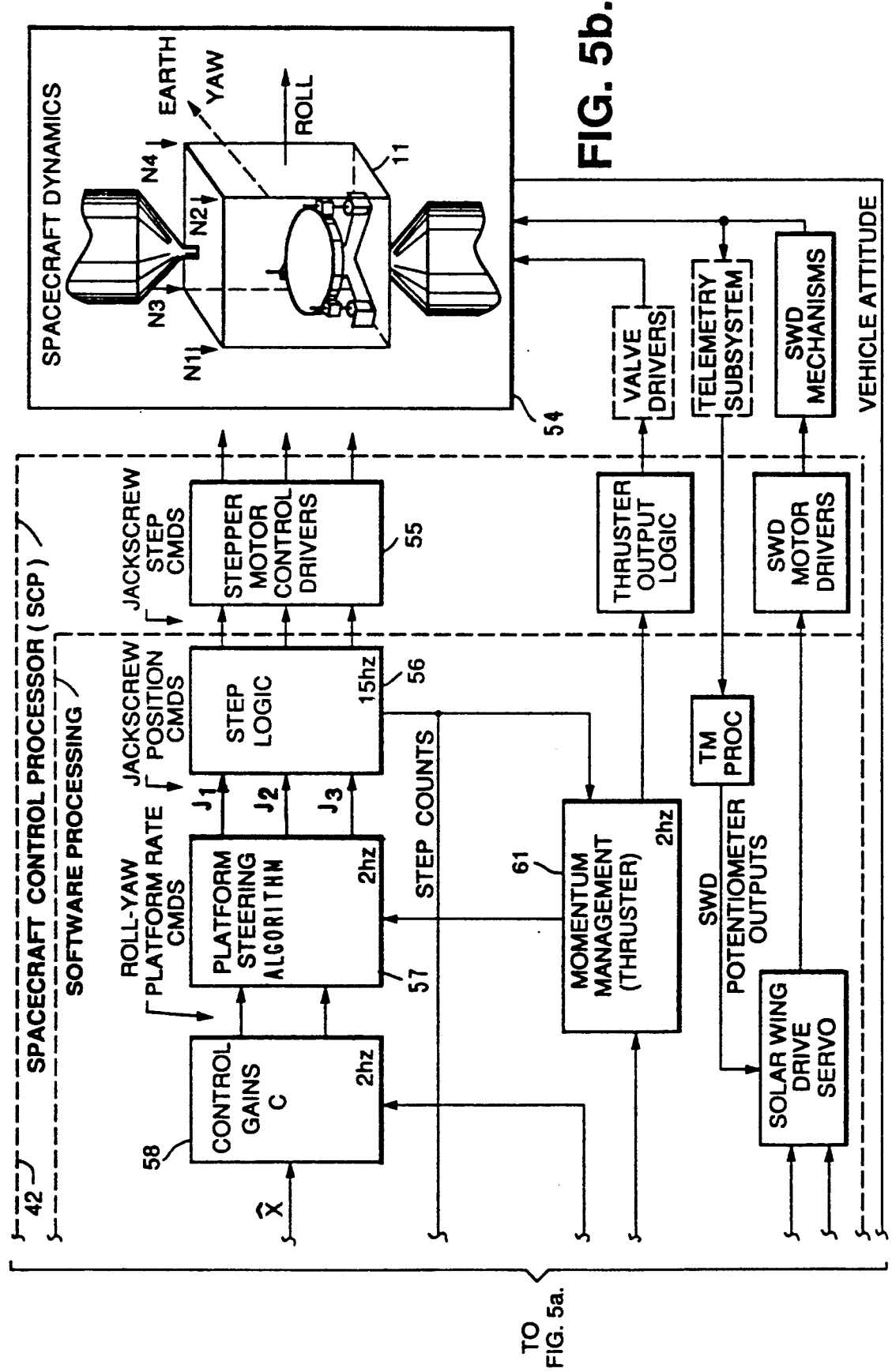

FIG. 5 is a simplified schematic diagram in block form of the spacecraft control processor 42 illustrated in FIG. 4. Again, it will be understood that the spacecraft control processor 42 also controls many other systems and processes completely unrelated to momentum wheel control that will not be described herein. As may be seen in FIG. 5, the momentum wheel platform assembly 11 is included within a spacecraft dynamics block 54. A stepper motor control drivers block 55 provides jackscrew step commands to the momentum wheel platform assembly 11, within the spacecraft dynamics block 54. The jackscrew step commands are produced by a step logic block 56, which receives jackscrew position commands from a platform steering algorithm block 57. Roll-yaw platform rate commands are applied to the platform steering algorithm block 57 by a control gains block 58. A roll-yaw state estimator 60 applies a signal to the control gains block 58. The step logic block 56 applies step counts to the roll-yaw state estimator 60 and to a momentum management block 61. The momentum management block 61 transmits data to the platform steering algorithm block 57, and exchanges data with the roll-yaw state estimator 60. A normal mode phase sequencing logic block 62 transmits data to the roll-yaw state estimator 60 and to the control gains block 58.

Figure 6:
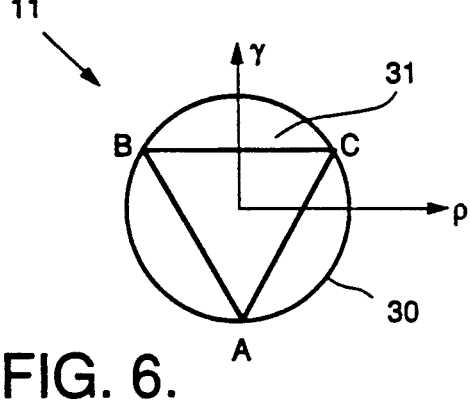
FIGS. 6 and 7 are top and side views, respectively, of a diagrammatic schematic drawing of a momentum wheel assembly defining the symbols used.
Figure 7:
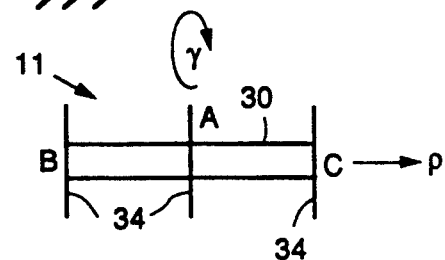

FIGS. 6 and 7 are top and side views, respectively, of a schematic drawing of a momentum wheel platform assembly 11 that is used to define the symbols that are used hereinafter. FIGS. 6 and 7 identify the actuator and axis orientation for the specific case where the actuators are at the vertices of an equilateral triangle. A triangular platform 31 has vertices A, B and C. Threaded screw shafts 34 driven by stepper motors (not shown) are secured at each of the vertices A, B and C of the triangular platform 31. The momentum wheel 30 is mounted to the triangular platform 31. The momentum wheel platform assembly 11 may be one of two such assemblies that are normally employed in the spacecraft 10, one designated "north" and one designated "south". FIGS. 6 and 7 show the $\rho$ and $\gamma$ axes associated with the momentum wheel platform assembly 11.

The momentum wheel platform steering system of the present invention is adapted to provide control torques to the spacecraft by rotating the momentum wheel platform assembly 11 about axes orthogonal to its nominal spin axis as well as to provide a means by which the momentum wheel platform may be raised or lowered without any accompanying rotations. The roll and yaw axis momentum wheel platform rotational rates $\dot{\rho}$ and $\dot{\gamma}$ are related to roll and yaw control torques as follows:

$$T_\phi = -H\dot{\gamma}, \text{ or } \dot{\gamma} = -T_\phi/H$$

$$T_\psi = -H\dot{\rho}, \text{ or } \dot{\rho} = -T_\psi/H$$

where $T_\phi$ and $T_\psi$ are the torques imparted to the spacecraft about the roll and yaw axes respectively, and H is the momentum, nominally 61 N-m-sec (45 ft-lb-sec). The method may be used to position each linear actuator independently, or it may be used to rotate the triangular platform 31 about the two axes $\rho$ and $\gamma$ at desired rates. In either case, the method of the present invention is used to compute the platform rotations that are in turn used by the roll/yaw control system that is part of the spacecraft control processor 42 to control the attitude angles and rates of the spacecraft.

With reference to the method of the present invention, when desired platform rates are supplied, they are first integrated and then transformed to required extensions of the linear actuators via a "forward transformation." These steps are bypassed when desired actuator extensions are supplied directly. The forward transformation expresses the three actuator extensions in terms of the two desired rotations. The measured actuator extensions are also transformed into platform rotations using a "backward transformation." The respective forward and backward transformations are given in general form in equations 1 and 2, respectively.

$$\begin{bmatrix} JA^d \\ JB^d \\ JC^d \end{bmatrix} = \begin{bmatrix} TR^a & TG^a \\ TR^b & TG^b \\ RT^c & TG^c \end{bmatrix} \begin{bmatrix} \rho^d \\ \gamma^d \end{bmatrix} + \begin{bmatrix} 0 & 1 & 1 \\ 1 & 0 & 1 \\ 1 & 1 & 0 \end{bmatrix} \begin{bmatrix} JA^f \\ JB^f \\ JC^f \end{bmatrix} \quad (1)$$

$$\begin{bmatrix} \rho \\ \gamma \end{bmatrix} = \begin{bmatrix} TA^\rho & TB^\rho & TC^\rho \\ TA^\gamma & TB^\gamma & TC^\gamma \end{bmatrix} \begin{bmatrix} JA \\ JB \\ JC \end{bmatrix} + \quad (2)$$

$$\begin{bmatrix} FA^\rho & FB^\rho & FC^\rho \\ FA^\gamma & FB^\gamma & FC^\gamma \end{bmatrix} \begin{bmatrix} JA^f \\ JB^f \\ JC^f \end{bmatrix}$$

where $JA^d$, $JB^d$, and $JC^d$ are the desired actuator extensions; JA, JB, and JC are the measured actuator extensions; TR and TG are the forward transformation coefficients; TA, TB, TC, FA, FB, and FC are the backward transformation coefficients, $\rho^d$ and $\gamma^d$ are the desired momentum wheel platform rotations; $\rho$ and $\gamma$ are the computed momentum wheel platform rotations; and $JA^f$, $JB^f$, $JC^f$ are the measured extensions of the actuators when failed.

When all three actuators are operational, these transformations are made unique by constraining the sum of the actuator extensions to be zero. When the actuators are positioned at the vertices of an equilateral triangle, this constraint forces the center of the platform 31 to remain at a fixed height. This constraint is desirable since it minimizes the required excursion of any actuator from the center of its actuation range. In the event of the failure of any single actuator, two-axis control of the platform 31 may be maintained without loss of performance by eliminating this constraint and setting the appropriate actuator extension in the backward transformation $JA^f$, $JB^f$, or $JC^f$ to its measured value.

The values for the forward and backward transformation coefficients depend upon which actuators are operational and their placement on the platform 31. For the specific case where the actuators are at the vertices of an equilateral triangle, and the axes are defined as shown in FIGS. 6 and 7, the values for the coefficients are given in Table 1.

TABLE 1

| Transformation Coefficients | | | | | | |
|---|---|---|---|---|---|---|
| Failed JS | Forward Transformation Parameters | | | | | |
| | $TR^a$ | $TG^a$ | $TR^b$ | $TG^b$ | $TR^a$ | $TG^b$ |
| none | −R | 0 | R/2 | (√3)R/2 | R/2 | −(√3)R/2 |
| A | 0 | 0 | 3R2 | (√3)R/2 | R/2 | −(√3)R/2 |
| B | −3R2 | −(√3)R/2 | 0 | 0 | 0 | −(√3)R |
| C | −3R2 | (√3)R/2 | 0 | (√3)R | 0 | 0 |

| Failed JS | Backward Transformation Parameters Multipliers of functioning jackscrew terms | | | | | |
|---|---|---|---|---|---|---|
| | TAρ | TBρ | TCρ | TAγ | TBγ | TCγ |
| none | −2/3R | 1/3R | 1/3R | 0 | (√3)/3R | −(√3)/3R |
| A | 0 | 1/3R | 1/3R | 0 | (√3)/3R | −(√3)/3R |
| B | −2/3R | 0 | 1/3R | 0 | 0 | −(√3)/3R |
| C | −2/3R | 1/3R | 0 | 0 | (√3)/3R | 0 |

| Failed JS | Backward Transformation Parameters Multipliers of failed jackscrew terms | | | | | |
|---|---|---|---|---|---|---|
| | FAρ | FBρ | FCρ | FAγ | FBγ | FCγ |
| none | 0 | 0 | 0 | 0 | 0 | 0 |
| A | −2/3R | 0 | 0 | 0 | 0 | −0 |
| B | 0 | 1/3R | 0 | 0 | (√3)/3R | 0 |
| C | 0 | 0 | 1/3R | 0 | 0 | −(√3)/3R |

Figure 8A:
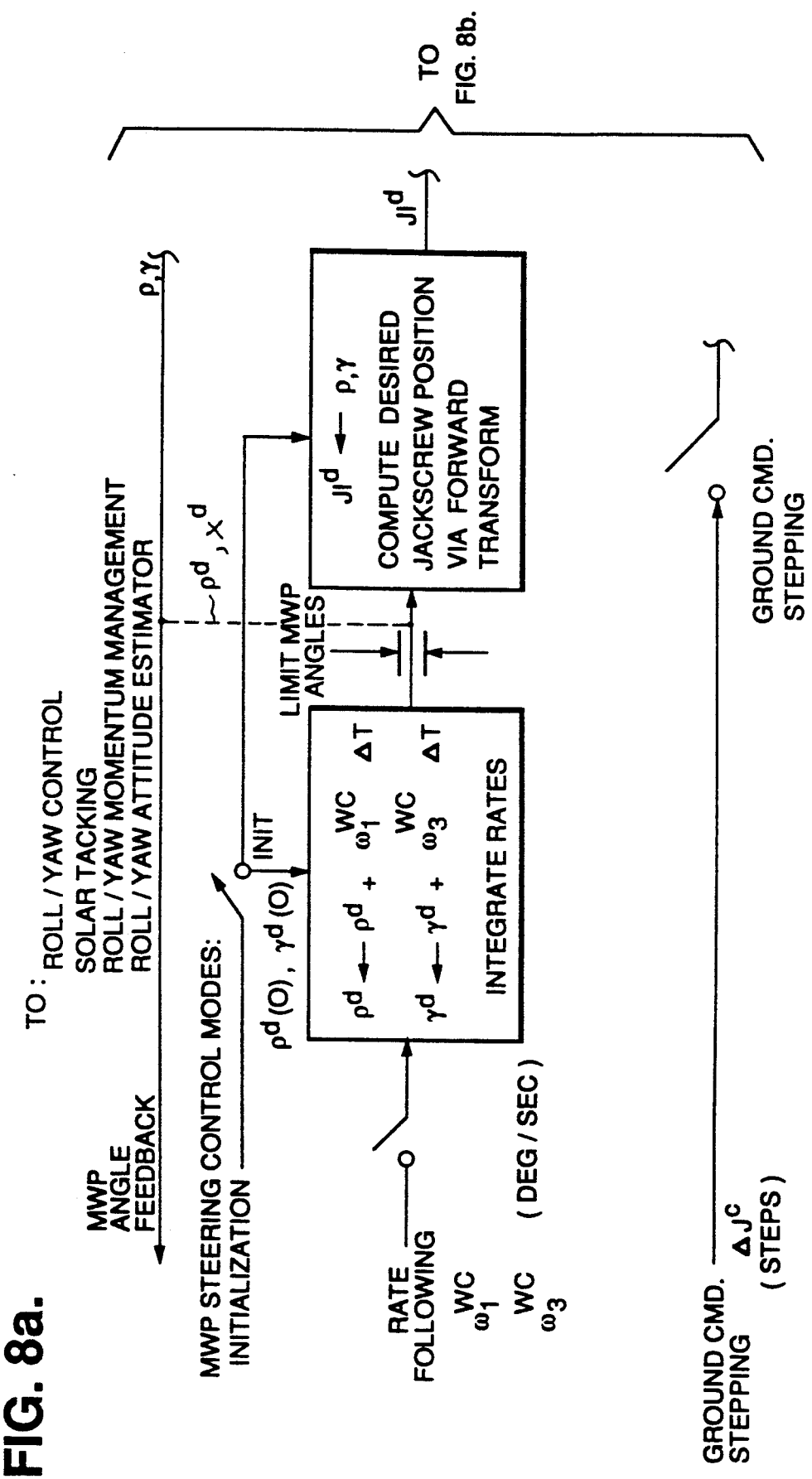
FIG. 8 is a diagram illustrating the momentum wheel platform steering system in accordance with the principles of the present invention.
Figure 8B:
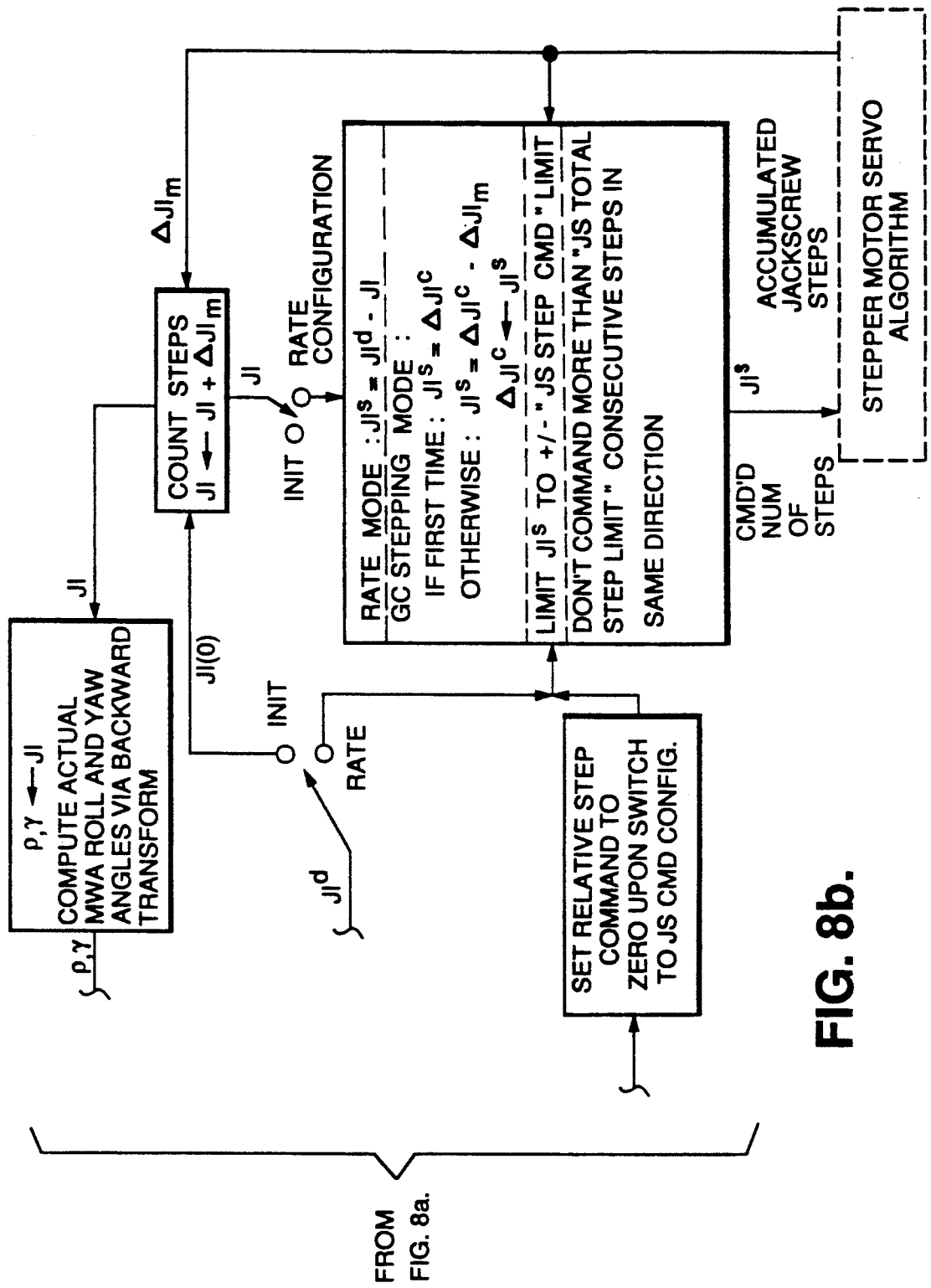

A block diagram illustrating the momentum wheel platform steering method of the present invention that controls the momentum wheel platform angles is shown in FIG. 8. The wiring to the jackscrew stepper motors 33 of the tilting mechanisms 32 is arranged so that the same method, without modification, may be used to control either the north or south momentum wheels.

The momentum wheel platform steering system has three operational command configurations. (1) Normally, the system is in rate following mode. In this configuration, momentum wheel platform rotational rate commands generated by the roll/yaw control system are first integrated to give desired platform angles, and then transformed into jackscrew extensions. Jackscrew step commands are computed as the difference between these desired extensions and the current positions of the jackscrews. The current jackscrew positions are also back-transformed to compute platform angles that are fed back to the roll-yaw state estimator 60.

(2) An alternative command configuration is ground commanded stepping. In this configuration, the momentum wheel platform steering system operates exactly as described above, except that relative jackscrew step commands from a ground station are utilized instead of the step commands computed in the rate following configuration. This command configuration enables the ground station to position the momentum wheel platform assembly 11.

(3) The final command configuration is initialization. This configuration, in which no jackscrew step commands are generated, is used by the ground station to initialize the control system with the existing momentum wheel platform angles. In this configuration, the ground station sends the current momentum wheel platform angles as measured by the potentiometers 36. The momentum wheel platform steering system in turn initializes the platform rate command integrator with these angles, transforms them into jackscrew extensions and initializes the jackscrew position registers. Then, utilizing the back transform, it initializes the computed momentum wheel platform angles which are fed back to the roll/yaw state estimator 60.

The momentum wheel platform steering system may be switched among its three operational configurations at any time using a ground station command. In some cases, an operational configuration at any time using a ground station command. In some cases, an operational configuration is automatically selected by software based on the body control mode. The typical operation configuration for each body control mode is indicated in Table 2.

TABLE 2

| Momentum wheel platform steering operational modes | | |
|---|---|---|
| Control Mode | Operational Configuration | How Commanded |
| Ascent | Inactive | N/A |
| Standby | Ground Command Stepping | Automatically by S/W |
| Gyro Pointing | Ground Command Stepping | Ground |
| Sun Pointing | Ground Command Stepping | Ground |
| Earth Pointing | Ground Command Stepping | Ground |
| Transition - thruster | Ground Command Stepping | Ground |
| Transition - wheel | Rate Following | Automatically by S/W |
| Normal | Rate Following | Ground (See Note 2) |
| Stationkeeping | Ground Command Stepping | Automatically by S/W |

Notes: (1) Initialization may be commanded at any time by ground command. (2) Since normal mode is preceded by wheel transition mode, the system is automatically in rate following in normal mode.

The forward and backward transformations for the three operating jackscrew case are stored on board by default. In the event of a jackscrew failure, an alternate forward and backward transformation may be commanded by ground to enable momentum wheel platform control with only two operating jackscrews.

Figure 9:
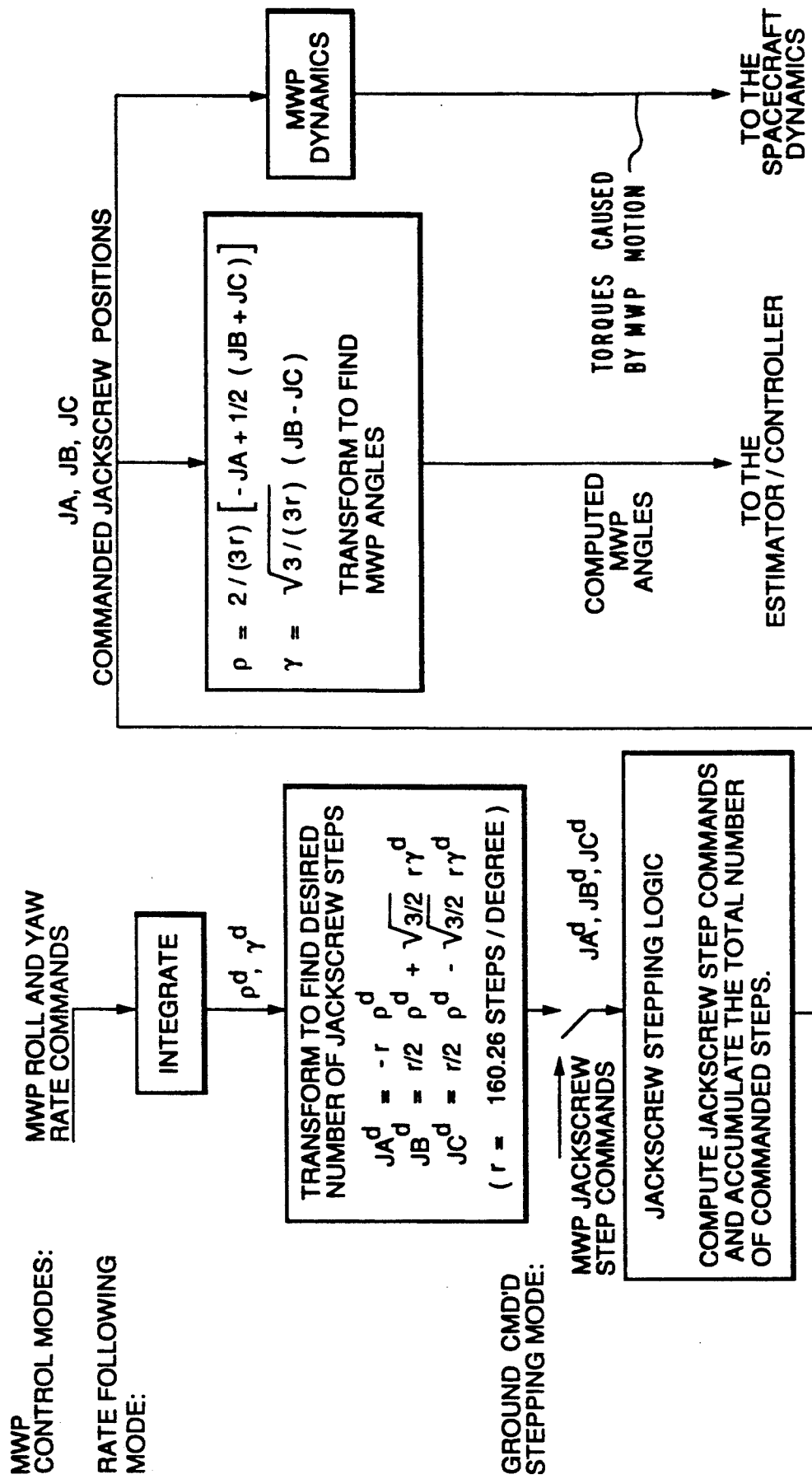
FIG. 9 is a diagram that defines the momentum wheel positioning logic showing transformations with three operational actuators.

The block diagram in FIG. 9 shows how the commanded momentum wheel platform rotational rates are transformed into individual step commands for the three jackscrews. First, these rotational rates are integrated to compute the desired momentum wheel platform orientation $\rho^d$ and $\gamma^d$.

In order to map the momentum wheel orientation $\rho^d$ and $\gamma^d$ into a unique set of jackscrew extensions when all three actuators are operational, the center of the platform 31 is constrained to remain stationary. This creates a set of three equations in three unknowns as shown in FIG. 9. The position of each jackscrew is computed by this set of equations and then quantized by the step size.

A constant rotational rate command results in a series of steps from one or more jackscrews, with an average stepping rate such as to give the desired rotational rate. The resulting torque applied to the spacecraft, while on average equal to the desired torque, is actually applied as a series of impulses when jackscrew steps occur and at any given time can be quite different from the command. For the spacecraft roll/yaw state estimator 60 to work accurately it needs to know the actual momentum wheel platform position and rates. The actual platform angles $\rho$ and $\gamma$ are computed by reversing the above-described transformation from three jackscrew extensions into two momentum wheel platform angles.

The momentum wheel platform 31 may be controlled about both the roll and yaw axes with only two of the three jackscrews. This capability may be used in the event of a jackscrew failure. In this case, the constraint that the center of the momentum wheel platform 31 remains stationary is dropped. The forward and backward transformations are given in general form in equations 1 and 2, respectively. In the event of a failure, the appropriate transform coefficients are selected from Table 1.

The forward and backward transformations for three operating jackscrews are stored in memory on board the spacecraft. In the event of a jackscrew failure, an alternative forward and backward transformation may be commanded by the ground station to enable momentum wheel platform control with only two operating jackscrews.

In the event of a failure it may be necessary to reinitialize the momentum wheel platform steering system. This may be accomplished by reading the extension of each jackscrew from the linear potentiometer measurements as provided in telemetry from the ground station. These may then be transformed to platform angles at the ground station by using the same transformation employed on board the spacecraft. The present method may then be reinitialized by commanding initialization configuration and uploading the initial platform angles. The present method resumes normal operation once it is switched to rate following mode.

It should be clearly understood that the momentum wheel platform steering system of the present invention may be operated in more than one manner, and is not limited to operation only according to the foregoing description. For example, in the particular implementation of platform angle feedback described hereinabove, the system accumulates jackscrew step commands, back-transforms the accumulated jackscrew step commands to compute platform angles, and feeds back the computed platform angles to the control system. As an alternative, the system could simply feed back the integrated platform rate commands to the control system, thus eliminating the entire back-transform operation.

Also, in the particular implementation of the rate following mode described hereinabove, the system computes the step command as the difference between the desired and the measured jackscrew position, where the measured jackscrew position is the sum of the previous step commands. There is also another measure of the jackscrew positions available. The potentiometers provide a measurement of jackscrew position that is normally used only at the ground control station. As an alternative, the system can compute the jackscrew step commands by using the potentiometer readings available in the spacecraft control processor, if desired. This alternative eliminates the need for the accumulation of the step commands.

Figure 10:
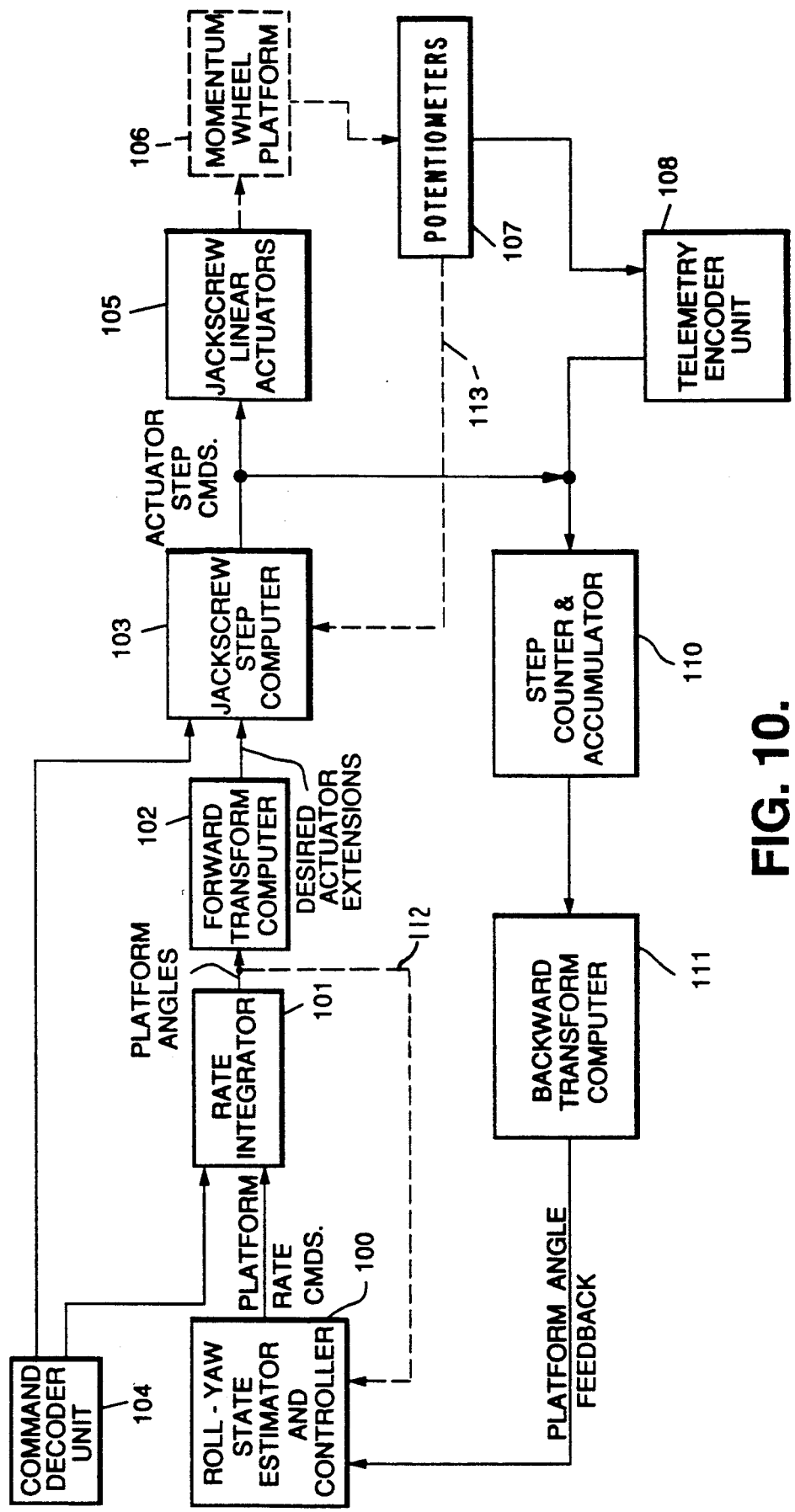
FIG. 10 is a simplified schematic diagram in block form of a spacecraft control system in accordance with the invention, indicating some alternative embodiments and variations.

Referring now to FIG. 10, there is shown an embodiment of the momentum wheel platform steering system of the present invention. In the embodiment of FIG. 10, a roll-yaw state estimator and controller 100 applies platform rate commands to a rate integrator 101 which produces platform angle commands that are applied to a forward transform computer 102. The forward transform computer 102 produces actuator extension commands that are applied to a jackscrew step computer 103. Alternatively, platform rate commands or platform angle commands may be transmitted via a command decoder unit 104, if desired. The jackscrew step computer 103 applies step commands to three jackscrews 105 which tilt a momentum wheel platform 106. The extension of the jackscrews 105 is measured by potentiometers 107 and the measurement transmitted by a telemetry encoder unit 108. The step commands are counted and accumulated in a step counter and accumulator 110. The accumulated step commands are applied to a backward transform computer 111 that produces platform angle feedback which is applied to the roll-yaw state estimator and controller 100. It should be apparent that it is not necessary to back transform the step commands and feed the computed angles back to the roll-yaw state estimator and controller 100. This procedure is not required for the system to operate. Alternatively, the integrated platform rate commands from the rate integrator 101 may be fed back to the roll-yaw state estimator and controller 100 as indicated by a connection shown as a dashed line 112 in FIG. 10. It will be apparent that this connection bypasses the entire back transform operation.

Secondly, in the embodiment of FIG. 10, the step command is computed in the jackscrew step computer 103 as the difference between the desired and measured jackscrew position. Once again, this procedure is not required for the system to operate. Alternatively, the step commands may be computed by using the readings or measurements of the potentiometers 107 which may be applied to the jackscrew step computer 103 as indicated by a connection shown as another dashed line 113. This removes the need for the accumulation of step commands.

Thus there has been described a new momentum wheel platform steering system and method that provides for attitude control of satellites. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Apparatus for controlling a spacecraft momentum wheel platform in an on-board computer-controlled rate following mode, said apparatus comprising:
   a roll-yaw state estimator and controller for generating desired momentum wheel platform rates;
   a rate integrator coupled to said roll-yaw state estimator and controller for integrating said desired momentum wheel platform rates to produce desired momentum wheel platform angles;
   a forward transform computer coupled to said rate integrator and responsive to said desired momentum wheel platform angles for computing desired actuator extensions;
   a step computer coupled to said forward transform computer and responsive to desired actuator extensions for producing actuator step command signals; and
   a momentum wheel platform having linear actuators coupled to said step computer for actuation of said linear actuators to tilt said momentum wheel platform a predetermined amount;
   the output of said rate integrator being fed back to said roll-yaw state estimator and controller as a momentum wheel platform angle feedback signal.

2. The apparatus of claim 1 which further comprises:
   a step counter and accumulator coupled to the output of said step computer for accumulating said actuator step command signals; and
   a backward transform computer coupled between said step counter and accumulator and said roll-yaw state estimator and controller for developing momentum wheel platform angle feedback and applying it to said roll-yaw state estimator and controller.

3. Apparatus for controlling a spacecraft momentum wheel platform in an on-board computer-controlled rate-following mode, said apparatus comprising:
   a roll-yaw state estimator and controller for generating desired momentum wheel platform rates;
   an on-board computer coupled to said roll-yaw state estimator and controller and responsive to said desired momentum wheel platform rates for computing desired actuator extensions;
   an actuator step computer coupled to said on-board computer and responsive to said desired actuator extensions for producing actuator step command signals by computing the difference between the desired actuator position and the existing actuator position, where the existing actuator position is determined by taking the sum of the previous actuator step command signals; and
   a momentum wheel platform having linear actuators coupled to said actuator step computer and responsive to said actuator step command signals for actuation of said linear actuators to tilt said momentum wheel platform a predetermined amount, thereby producing said desired momentum wheel platform rate.

4. The apparatus of claim 3 which further comprises:
   a spacecraft;
   a tiltable platform disposed on said spacecraft;
   three pivots for supporting said platform disposed equidistantly therearound;
   three linear actuators each comprising a jackscrew driven by a stepper motor, each of said linear actuators being individually coupled to a different one of said pivots and being adapted to raise or lower its respective pivot;
   a momentum wheel mounted to said platform and being adapted to spin at high speed about a spin axis to produce a momentum vector, the spin axis of said wheel being initially aligned in a predetermined direction with respect to said spacecraft, said platform and said wheel being adapted to be tilted through small angles to produce a component of the wheel momentum vector in a plane transverse to the spin axis of said wheel;
   three linear potentiometers each individually coupled to a different one of said pivots for providing an indication of the extension of the respective ones of said linear actuators;
   wherein the actuator step computer produces actuator step command signals by computing the difference between the desired actuator position and the existing actuator position, where the existing actuator position is based on the indication provided by said three linear potentiometers;
   said three linear actuators being coupled to said actuator step computer and responsive to said actuator step command signals for actuation of said linear actuators to tilt said tiltable platform and said momentum wheel a predetermined amount, thereby producing said desired momentum wheel platform rate.

5. An attitude control system for a spacecraft comprising:
- a spacecraft;
- a tiltable platform disposed on said spacecraft;
- three pivots for supporting said platform disposed equidistantly therearound;
- three linear actuators each comprising a jackscrew driven by a stepper motor, each of said linear actuator being individually coupled to a different one of said pivots and being adapted to raise or lower its respective pivot;
- a momentum wheel mounted to said platform and being adapted to spin at high speed about a spin axis to produce a momentum vector, the spin axis of said wheel being initially aligned in a predetermined direction with respect to said spacecraft, said platform and said wheel being adapted to be tilted through small angles to produce a component of the wheel momentum vector in a plane transverse to the spin axis of said wheel;
- an on-board computer disposed on said spacecraft for computing desired roll-yaw momentum wheel platform rates for said spacecraft;
- a platform steering computer coupled to said on-board computer for converting said roll-yaw momentum wheel platform rates to jackscrew position commands;
- a step logic computer coupled to said platform steering computer for converting said jackscrew position commands to jackscrew step commands; and
- a plurality of stepper motor control drivers coupled from said step logic computer to said linear actuators for applying said jackscrew step commands to said stepper motors.

6. The apparatus of claim 5 which further comprises:
- three linear potentiometers each individually coupled to a different one of said pivots for providing an indication of the extension of the respective ones of said linear actuators;
- a telemetry encoder unit coupled to said potentiometers for telemetering said indication to a control location; and
- a command decoder unit for receiving commands intended to control the tilt of said momentum wheel;
- wherein the on-board computer comprises a roll-yaw state estimator and controller coupled to said command decoder for converting said commands to desired roll-yaw momentum wheel platform rates; and
- wherein the platform steering computer is coupled to said roll-yaw state estimator and controller for converting said roll-yaw momentum wheel platform rate commands to jackscrew position commands.

7. The apparatus of claim 5 wherein the on-board computer further comprises:
- command means for generating jackscrew commands and applying them to said three linear actuators for tilting said momentum wheel;
- accumulating means coupled to said command means for accumulating jackscrew commands;
- back-transformation means coupled to said accumulating means for back-transforming accumulated jackscrew commands to compute momentum wheel platform angles; and
- feedback means for applying computed momentum wheel platform angles to said platform steering computer.

8. The apparatus of claim 5 which further comprises:
- means for providing desired platform rates to said spacecraft on-board computer;
- means for integrating said platform rates;
- means for transforming said integrated platform rates to required linear actuator extensions via a forward transformation;
- means for constraining a failed actuator to its measured actuator extension;
- means for applying position commands for operable actuators to a step logic computer that converts them into step commands; and
- means for applying the step commands to the stepper motors of the operable linear actuators to produce the desired platform rates.

9. The apparatus of claim 8 which further comprises:
- means for transforming said integrated platform rates to required linear actuator extensions via a forward transformation;
- means for providing measurements of existing linear actuator extensions to said spacecraft on-board computer; and
- means for transforming measured actuator extensions to platform rotations via a backward transformation.

10. The apparatus of claim 5 which further comprises:
- means for computing desired jackscrew extensions from desired platform angles;
- means for measuring existing jackscrew extensions;
- means for generating jackscrew step commands as the difference between desired jackscrew extensions and measured jackscrew extensions;
- means for counting jackscrew step commands to update the jackscrew position register; and
- means for back-transforming the desired jackscrew extensions to compute platform angles.

11. A method for controlling a spacecraft momentum wheel platform in an on-board computer-controlled rate following mode, said method comprising the following steps:
- generating desired momentum wheel platform rate commands in a roll-yaw state estimator and controller;
- integrating said desired momentum wheel platform rate commands to produce desired momentum wheel platform angle commands;
- forward transforming said desired momentum wheel platform angle commands to produce desired actuator extension commands;
- computing actuator step command signals from said desired actuator extension commands;
- applying said actuator step command signals to the spacecraft momentum wheel platform to produce tilt thereof.

12. The method of claim 11 which further comprises the step of:
- applying the integrated momentum wheel platform rate commands to the roll-yaw state estimator and controller as a momentum wheel platform angle feedback signal.

13. The method of claim 11 which further comprises the steps of:
- accumulating said actuator step command signals;

back transforming said actuator step command signals to produce momentum wheel platform angle feedback signals; and applying said momentum wheel platform angle feedback signals to said roll-yaw state estimator and controller.

14. The method of claim 11 wherein the step of computing actuator step command signals comprises the step of:

computing actuator step command signals as the difference between the desired actuator position and the existing actuator position, where the existing actuator position is determined by taking the sum of the previous actuator step command signals.

15. The method of claim 11 wherein the step of computing actuator step command signals comprises the step of:

computing actuator step command signals as the difference between the desired actuator position and the existing actuator position, where the existing actuator position is determined by taking the output of linear potentiometers connected to the momentum wheel platform.

16. A method for controlling platform rates of a momentum wheel platform comprising the following steps:

providing desired platform rates to a spacecraft on-board computer;

integrating said platform rates;

transforming said integrated platform rates to required linear actuator extensions via a forward transformation;

providing measurements of existing linear actuator extensions to said spacecraft on-board computer;

transforming measured actuator extensions to platform rotations via a backward transformation;

constraining the sum of the actuator extensions to be zero;

applying actuator position commands to a step logic computer that converts them into step commands; and applying the step commands to the stepper motors of the linear actuator to produce the desired platform rates.

17. The method of claim 15 that is further adapted to control a momentum wheel platform having a failed actuator, said method further comprising the steps of:

computing actuator step command signals for operable actuators by constraining the failed actuator to its existing extension; and applying the step command signals to the stepper motors of the operable linear actuators to produce the desired platform rates.

18. A method of controlling a momentum wheel platform in an on-board computer controlled rate following mode, said method comprising the following steps:

generating platform rate commands in an on-board computer;

integrating platform rate commands to provide desired platform angles;

computing desired jackscrew extensions from desired platform angles;

measuring existing jackscrew extensions;

generating jackscrew step commands as the difference between desired jackscrew extensions and measured jackscrew extensions; and applying the jackscrew step commands to the jackscrews to tilt the momentum wheel platform.

19. A method of controlling a momentum wheel platform by ground command, said method comprising the following steps:

transmitting desired jackscrew position commands from a ground control to a spacecraft;

measuring existing jackscrew extensions;

generating a number of jackscrew step commands equal to the desired jackscrew position command from ground; and applying the jackscrew step commands to the jackscrews to tilt the momentum wheel platform.

20. The method of claim 19 which further comprises initializing a system for controlling the tilt of the momentum wheel platform on board the spacecraft by command from the ground station, and wherein said method comprises the following steps:

telemetering existing jackscrew extensions as measured by potentiometers on the spacecraft to the ground station;

transforming measured jackscrew extensions to existing platform angles at the ground station;

transmitting existing platform angles from the ground station to the spacecraft;

initializing the platform rate command integrator with the transmitted platform angles;

transforming the platform angles into jackscrew extensions;

initializing the jackscrew position registers; and initializing the computed platform angles using the back transform.

* * * * *

UNITED STATES PATENT AND TRADEMARK OFFICE
CERTIFICATE OF CORRECTION

PATENT NO. : 5,261,631

DATED : NOVEMBER 16, 1993

INVENTOR(S) : DOUGLAS J. BENDER, ET AL.,

It is certified that error appears in the above-identified patent and that said Letters Patent is hereby corrected as shown below:

On title page, Item 75 should read as follows:

Inventors: William F. Hummel, Jr., Los Angeles; Douglas J. Bender, Redondo Beach; James D. Brehove, Corona; all of California Column 11, Claim 5, lines 8-9, should read "actuators" not "actuator."

Signed and Sealed this

Twenty-second Day of April, 1997

Attest:

BRUCE LEHMAN

Attesting Officer

Commissioner of Patents and Trademarks